United States Patent
Parmar et al.

(10) Patent No.: US 9,418,469 B1
(45) Date of Patent: Aug. 16, 2016

(54) GENERATING VIDEO CONTENT

(71) Applicant: Outward, Inc., San Jose, CA (US)

(72) Inventors: Manu Parmar, Sunnyvale, CA (US); Zhanpeng Feng, Fremont, CA (US); Clarence Chui, Los Altos Hills, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 14/337,125

(22) Filed: Jul. 21, 2014

Related U.S. Application Data

(60) Provisional application No. 61/856,582, filed on Jul. 19, 2013.

(51) Int. Cl.
*G06T 15/06* (2011.01)
*H04N 19/597* (2014.01)

(52) U.S. Cl.
CPC .......... *G06T 15/06* (2013.01); *H04N 19/00769* (2013.01); *G06T 2200/04* (2013.01); *G06T 2207/10021* (2013.01)

(58) Field of Classification Search
CPC ..................................................... G06T 15/06
See application file for complete search history.

(56) References Cited

U.S. PATENT DOCUMENTS

| | | | |
|---|---|---|---|
| 6,693,964 B1 * | 2/2004 | Zhang | H04N 19/23 375/240.14 |
| 8,350,846 B2 * | 1/2013 | Mejdrich | G06T 17/005 345/418 |
| 2012/0169728 A1 * | 7/2012 | Mora | G06T 15/06 345/419 |

* cited by examiner

*Primary Examiner* — Jeffrey Chow
(74) *Attorney, Agent, or Firm* — Van Pelt, Yi & James LLP

(57) ABSTRACT

Improved techniques for generating video content are disclosed. In some embodiments, a frame is first rendered using a first rendering option. It is then determined whether the frame is an independent frame (I-frame) or a predictive frame (P-frame). In the event that the frame is an I-frame, the frame is rendered using a second rendering option. In the event that the frame is a P-frame, the frame as rendered by the first rendering option and a previous frame as rendered by the first rendering option are used to determine prediction error. The first rendering option comprises a lower computational complexity than the second rendering option.

30 Claims, 7 Drawing Sheets

GENERATING VIDEO CONTENT

CROSS REFERENCE TO OTHER APPLICATIONS

This application claims priority to U.S. Provisional Patent Application No. 61/856,582 entitled COMPRESSION-AWARE CONTENT CREATION filed Jul. 19, 2013 which is incorporated herein by reference for all purposes.

BACKGROUND OF THE INVENTION

Generating video content using ray tracing is computationally intensive. Techniques to reduce the time needed to generate video content would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
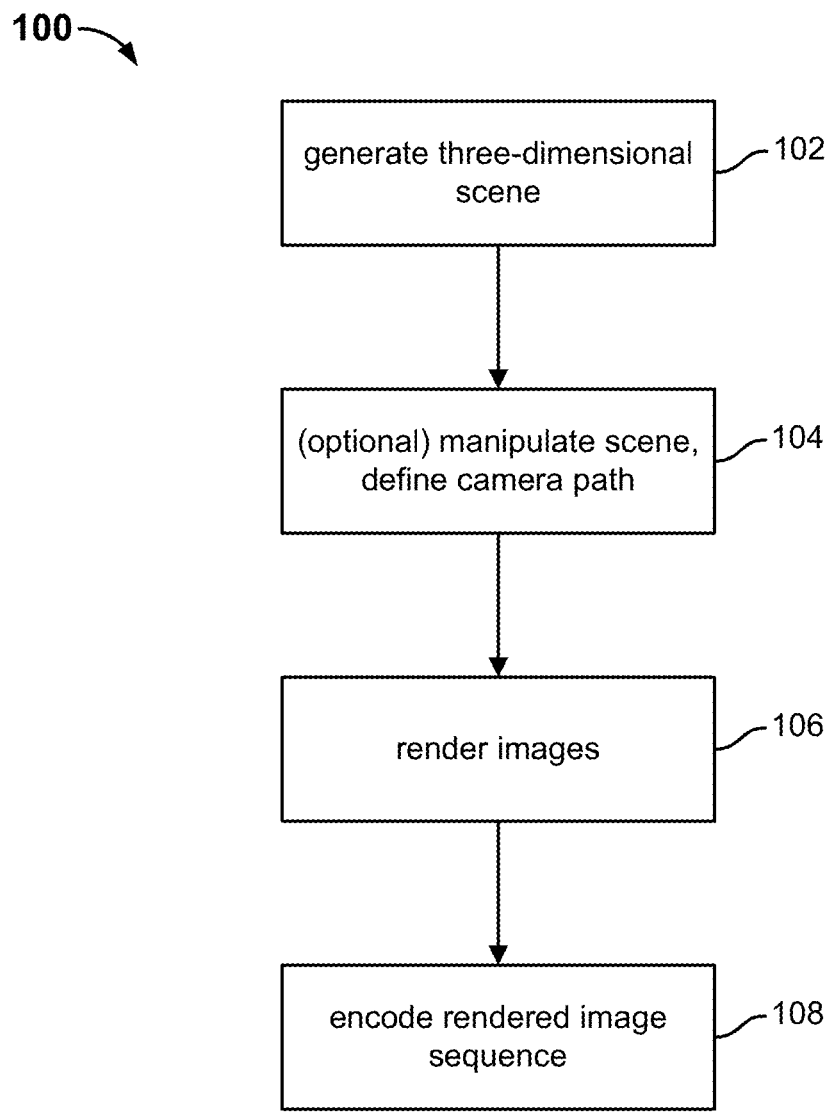
FIG. 1 is a high level flow chart illustrating an embodiment of a process for generating compressed video content.

FIG. 1 is a high level flow chart illustrating an embodiment of a process for generating compressed video content. Process 100 starts at step 102 at which a three-dimensional (3D) scene is generated. For example, a three-dimensional description of a cut from input video content may be created at step 102. In some embodiments, the three-dimensional scene generated at step 102 comprises modeled or virtualized content. In some such cases, for instance, original input source content may be transformed into a substantially or completely virtualized representation in which little, if any, pixel and/or other data from the original source content is preserved in the three-dimensional modeled or virtualized representation of the source content generated at step 102. In some embodiments, the three-dimensional scene generated at step 102 comprises a prescribed computational space based representation. At step 104, the scene generated at step 102 is optionally manipulated and/or a camera path is defined. That is, the scene generated at step 102 and/or portions thereof may optionally be modified and/or customized at step 104, for example, by modifying objects, adjusting lighting, correcting perceived performance errors, etc. Moreover, step 104 includes defining one or more camera paths. In some cases, for instance, step 104 includes introducing one or more alternative camera positions and/or perspectives, for example, in addition to or instead of a default virtual camera appropriately located in a position to recreate a perspective defined by original source content from which the three-dimensional scene is generated at step 102. At step 106, images associated with the scene are rendered. For example, step 106 may comprise rendering photo-real images of the field of view of a camera as it travels its path. In some embodiments, the rendering of step 106 is at least in part based on ray-tracing. At step 108, the image sequence rendered at step 106 is encoded in an application-appropriate way. The quality of the output video stream may vary. For example, the output video stream may comprise a highly compressed 720p video stream for delivery over the web or may comprise a lightly compressed 4 k video stream for playing on a large screen in a theater.

Figure 2:
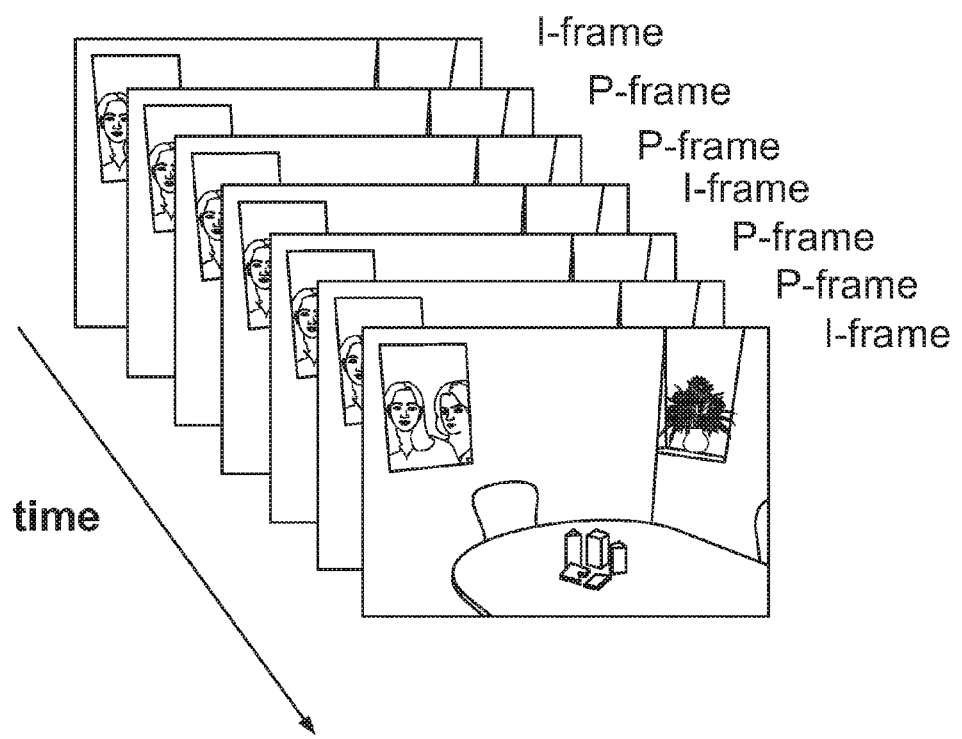
FIG. 2 illustrates an embodiment of grouping image frames of a video sequence into I-frames and P-frames.

In various applications, a ray-traced sequence of images may be compressed using any appropriate video encoding algorithm such as MPEG, H.264, etc., at step 108. Common video encoding methods typically first comprise classifying frames into groups. For example, frames may be classified into I-frames (i.e., independent frames that are encoded and/or processed independently of other, neighboring frames), into P-frames (i.e., predictive frames that only encode data that has changed since the last I-frame), and/or B-frames (i.e., bi-directional frames that encode changes from previous and next I-frames). Henceforth, for simplicity, only I-frames and P-frames are considered in the given examples, although the disclosed techniques may be similarly extended to any other frame classification scheme. FIG. 2 illustrates an embodiment of grouping image frames of a video sequence into I-frames and P-frames. Each I-frame is encoded independently. Each P-frame encodes only the differences or deltas between predicted and real values of image pixels. To encode a P-frame, for example, the frame is divided into blocks; for each block, the most similar block in the previous I-frame is found and used as the predicted value of that P-frame block; and the differences or deltas between predicted and real values are encoded along with the motion vector. The prediction error is small if there is little motion between the frames or if motion estimation is accurate.

Figure 3A:
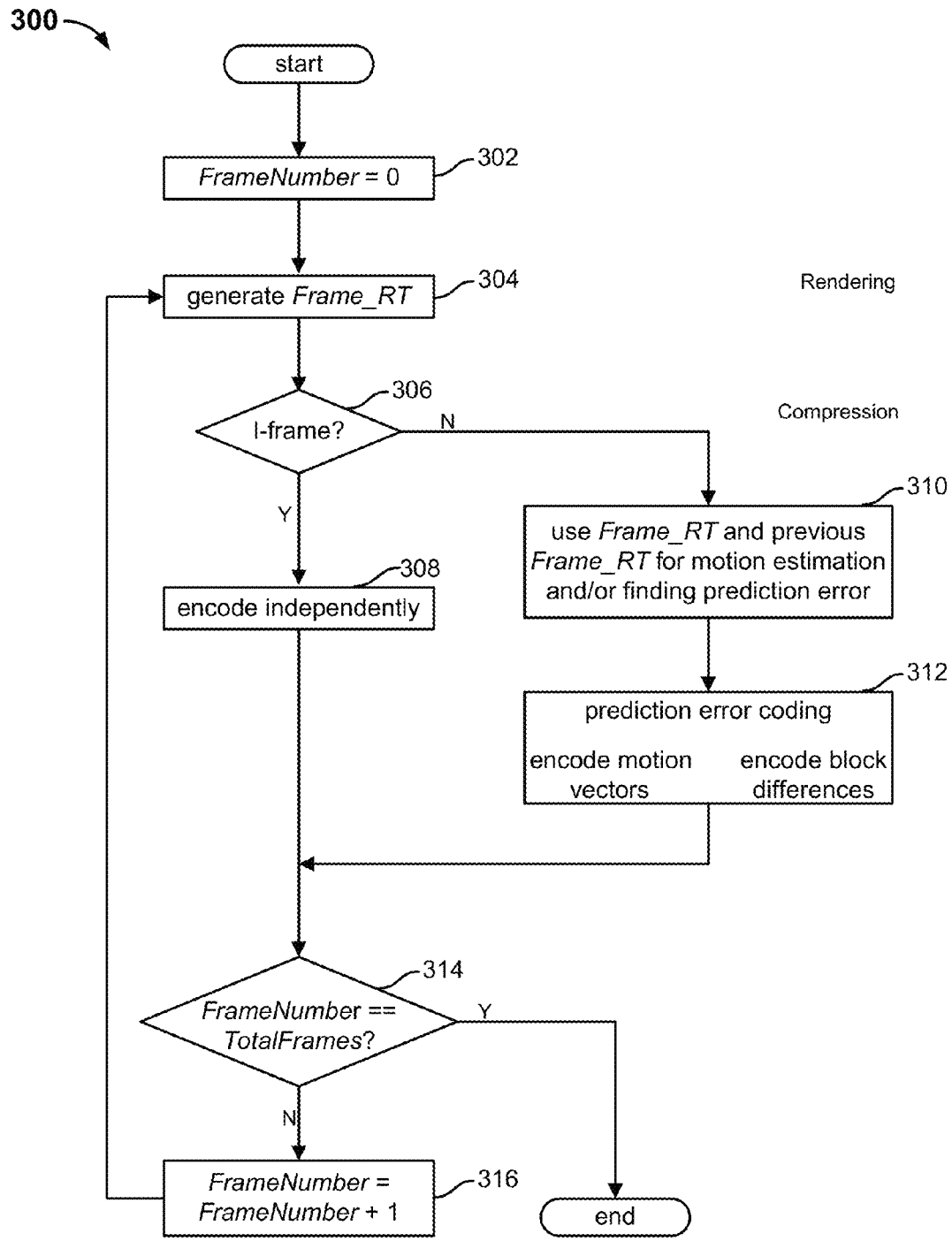
FIG. 3A is a high level flow chart illustrating a conventional process for rendering and compression.

FIG. 3A is a high level flow chart illustrating a conventional process for rendering and compression. Process 300 starts at step 302 at which a first frame is selected for processing. At step 304, the frame is rendered with ray-tracing, i.e., Frame_RT is generated. Specifically, the frame is ray-traced at step 304 in full detail (e.g., large number of samples, multiple bounces, etc.). At step 306, it is determined if the frame is an I-frame. If it is determined at step 306 that the frame is an I-frame, it is encoded independently at step 308. If it is determined at step 306 that the frame is not an I-frame, Frame_RT and the previous Frame_RT are used to estimate motion and/or determine prediction error at step 310. At step 312, prediction error coding is performed, i.e., motion vectors and block differences are encoded. At step 314, it is determined if all frames have been processed. If it is determined at step 314 that all frames have not been processed, the next frame is selected for processing at step 316, and process 300 repeats from step 304. If it is determined at step 314 that all frames have been processed, process 300 ends.

As described, the rendering stage of process 300 uses ray-tracing, which is computationally an expensive task (e.g., it often takes 45-60 minutes to render a high-quality frame using current hardware). Moreover, motion compensation using block matching, which is an integral part of encoding P-frames, is the most expensive part of the encoding stage (e.g., taking up to 80% of encoding time). If $t_{RT}$ is the time taken to generate ray-traced frame Frame_RT and $t_{MV}$ is the time taken to compute motion vectors for a frame, the total time taken to generate a video sequence is dominated by:

$$t_{RT} \times \text{numberTotalFrames} + t_{MV} \times \text{number}P\text{Frames} \quad (1)$$

If there is a small or a predictable motion of the camera and/or objects between adjacent frames, the rendered frames are very similar. Video compression takes advantage of this redundancy by only storing the changes in pixel values between frames. Techniques for joint rendering and compression that take further advantage of the same redundancy are disclosed herein. As described, faster processing is facilitated by ray-tracing only a few frames in full-detail (large number of samples, multiple bounces, etc.) and capturing significant components of change between other frames from images rendered with a low-cost and low-complexity rendering method.

Figure 3B:
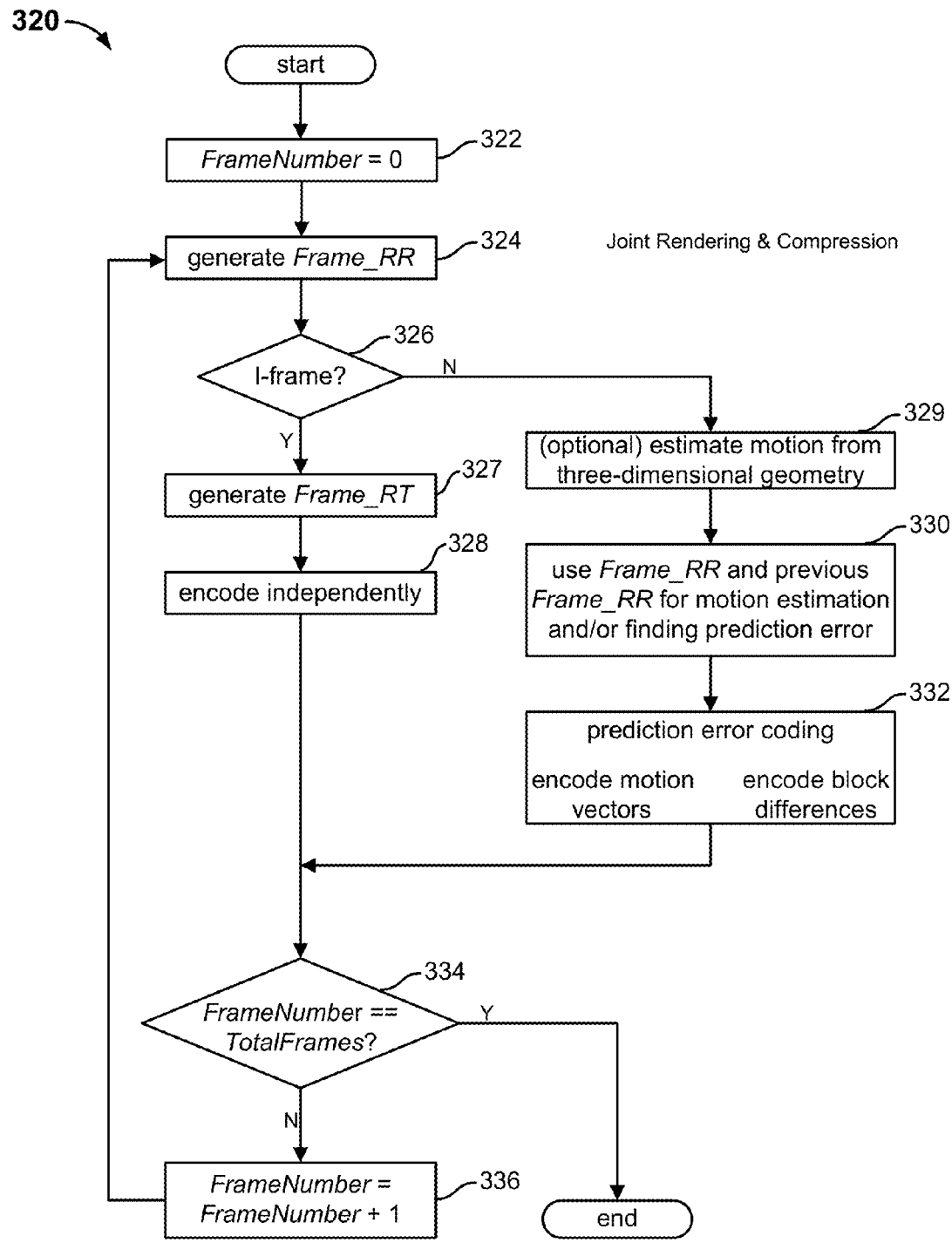
FIG. 3B is a high level flow chart illustrating an embodiment of a process for joint rendering and compression.

FIG. 3B is a high level flow chart illustrating an embodiment of a process for joint rendering and compression. Process 320 starts at step 322 at which a first frame is selected to be processed. At step 324, the frame is rendered with a low cost/complexity rendering option, i.e., Frame_RR is generated. For example, the low cost and complexity rendering option of step 324 may comprise raster-based rendering or simple ray-tracing with a few ray samples and bounces. At step 326, it is determined if the frame is an I-frame. If it is determined at step 326 that the frame is an I-frame, the frame is rendered with ray-tracing, i.e., Frame_RT is generated, at step 327. Specifically, the frame is ray-traced at step 327 in full detail (e.g., large number of samples, multiple bounces, etc.). The ray-traced frame is then encoded independently at step 328. If it is determined at step 326 that the frame is not an I-frame, Frame_RR and the previous Frame_RR are used to estimate motion and/or determine prediction error at step 330. In some embodiments, motion may be optionally estimated from a known three-dimensional geometry of the scene at step 329, such as the three-dimensional scene generated in process 100 of FIG. 1. In some embodiments, step 329 of process 320 may be included (e.g., before step 310) in process 300 to estimate motion from a known three-dimensional geometry of the scene. At step 332, prediction error coding is performed, i.e., motion vectors and block differences are encoded. At step 334, it is determined if all frames have been processed. If it is determined at step 334 that all frames have not been processed, the next frame is selected for processing at step 336, and process 320 repeats from step 324. If it is determined at step 334 that all frames have been processed, process 320 ends.

As described, in joint rendering and encoding process 320, all frames are rendered using a low cost/complexity rendering option (e.g., raster-based rendering or ray-tracing with a few ray samples and bounces), and only the I-frames are rendered in full-detail. Moreover, motion vectors for P-frames are in some embodiments computed from the three-dimensional geometry of the scene. If $t_{RR}$ is the time taken to generate Frame_RR, $t_{RT}$ is the time taken to generate Frame_RT, and $t_{3DMV}$ is the time taken to compute motion vectors using 3D geometry, the total time taken to generate a video sequence is dominated by:

$$t_{RR} \times \text{numberTotalFrames} + t_{RT} \times \text{number}I\text{Frames} \quad (2)$$

The reduction in computation time for generating video content depends on the following ratios:

$$t_{RR}/t_{RT} \quad (3)$$

$$\text{number}I\text{Frames}/\text{numberTotalFrames} \quad (4)$$

Consider Eq. (3) and Eq. (4) in the context of a rendering experiment with a three-dimensional model associated with the image frames of FIG. 2. It was found that if Frame_RR is rendered with single-bounce ray-tracing with an equal number of samples as Frame_RT, the ratio $t_{RR}/t_{RT}$ is 55/330 seconds=0.16, resulting in about a factor of 5 reduction in time. Moreover it was found that if Frame_RR is rendered with a raster-based method (real time for 60 Hz video), the ratio $t_{RR}/t_{RT}$ is 0.016/330 seconds=5.0505e-05, resulting in about a factor of 20000 reduction in time. Greater time reductions lead to poorer (or less accurate) quality of P-frames. Reduction in render time due to Eq. (4) affects video quality when there is fast motion of either a camera or objects in a scene. In the aforementioned three-dimensional model associated with the image frames of FIG. 2, for instance, there are several 20-30 frame long portions with relatively small motion that can be captured mainly with one I-frame.

Figure 4:
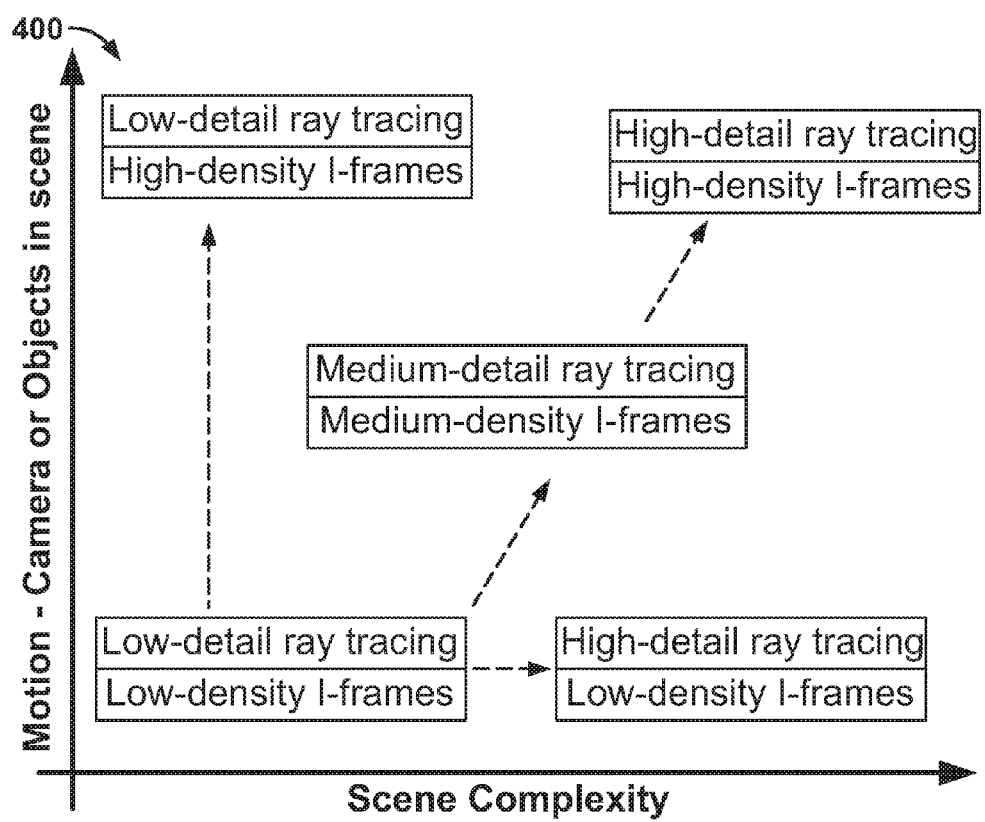
FIG. 4 is a graph illustrating an embodiment of a trade-off between quality and render time as a function of scene complexity and motion.

FIG. 4 is a graph illustrating an embodiment of a trade-off between quality and render time as a function of scene complexity and motion, with the dashed arrows pointing towards increasing render times, e.g., while maintaining a prescribed quality. The complexity of a video cut shot is related to the complexity of the scene (i.e., the x-axis of graph 400) and the complexity of motion in the scene (i.e., the y-axis of graph 400). The complexity of a scene is based on the number of objects in the scene and the surface properties of the objects. For instance, objects with glossy BRDFs (bidirectional reflectance distribution functions) interact in a more complex way with light rays than objects with perfectly diffuse or specular BRDFs. The complexity of motion is based on the motions of objects and/or a camera between frames. For instance, for fast motion of objects or a camera between frames, the similarity of pixel values in these frames is reduced. For more complex videos (having large motion and/ or more complex scenes), prediction errors calculated with simple raster-based rendering may not be well correlated with the prediction errors in Frame_RT. In such cases, more sophisticated rendering methods for calculating Frame_RR may be used and/or I-frames may be used more frequently.

The ray-tracing method generates a render by solving the light transport equation:

$$L(x, \omega_0) = \int_{H^2_{(n)}} BRDF(x, \omega_0, \omega_i) L(x, \omega_i) \cdot |\cos\theta_i| d\omega_i, \quad (5)$$

where x is a point on a surface, $\omega_o$ and $\omega_i$ are the outgoing and incoming directions respectively, $L(x, \omega_i)$ is the radiance of the incoming light, and $\theta_i$ is the angle between the incoming ray and the surface normal.

The Monte Carlo estimate of the integral $I=\int_s f(x)dx$ is:

$$\hat{I} = \frac{1}{N}\sum_{i=1}^{N}\frac{f(x_i)}{p(x_i)}, \quad (6)$$

where $p(x_i)$ is a probability density function.

From Eqs. (5) and (6), the Monte Carlo estimate of radiance is:

$$L(x, \omega_0) = \frac{1}{N}\sum_{\substack{1\leq i\leq M \\ 1\leq j\leq N}} \frac{BRDF(x, \omega_o, \omega_i)L_j(x, \omega_i)\cdot|\cos\theta_i|}{p(x_i)}, \quad (7)$$

where N is the number of ray samples and M is the number of direct and indirect light sources. Write Eq. (7) as:

$$L = \sum_{\substack{1\leq i\leq M \\ 1\leq j\leq N}} \alpha_i\beta_j, \quad (8)$$

where $\alpha_i$ accounts for the reflectance components and $\beta_j$ accounts for the light sources (including bounces from other surfaces in the scene). For a scene that has mainly diffuse reflection surfaces and diffuse inter-reflection can be ignored, Eq. (7) is well approximated by raster-based rendering. For a scene that has many surfaces with glossy BRDFs, the raster-based render is not accurate. For such scenes, a more sophisticated method for computing Frame_RR may be used, e.g., by including indirect lighting. In a low complexity scene, both N and M are 1, assuming reflectance along all directions can be aggregated into one diffuse reflection term and all light sources can be aggregated into one ambient light source. This is equivalent to a scene rendered with raster-based options, resulting in a large saving in render time. In a highly complex scene, both N and M have large values. This is equivalent to the method used to compute Frame_RT, resulting in little or no saving in render time.

Motion compensation is used in video coding to improve compression efficiency. Pixel values in a predicted frame are described in terms of motion from values at locations in a reference frame. For instance, if a camera is panning slowly, for most pixels, knowledge of the amount of pan can be used to calculate pixel offsets between adjacent frames. Pixel intensity values need to be stored explicitly only for the reference frames. For predicted frames, only the calculated offsets and the small prediction errors need be stored. This leads to improved compression performance.

Any appropriate technique may be employed to encode motion information. In some embodiments, global motion compensation (GMC) is employed to encode motion information. In GMC in traditional encoders, a global affine transform that accounts for camera pan, zoom, and rotation is estimated. A predicted frame (called an S-frame for sprite frame) is generated by transforming the reference frame by this global transform. For this predicted frame, only the global transform and prediction errors are stored. If prediction is accurate, errors are small, and the compression factor is improved significantly. GMC is particularly amenable when camera geometry for each frame is known. In such cases, the affine transformation between any two frames is a known transformation, and GMC is more accurate than if the affine transform were estimated from frame data. GMC is most effective if only the camera is moving and there is no motion of objects in the scene. In some embodiments, local motion compensation is employed to encode motion information. Local compensation may be pixel-based or block-based. A pixel (or a block of pixels) in a P-frame is related to a pixel (or a block of pixels) in a reference frame by a motion vector. Only the motion vectors and prediction errors are stored for the P-frames. One common but computationally expensive process of finding motion vectors is a block based search in the reference frame for a block in the predicted frame.

Figure 5:
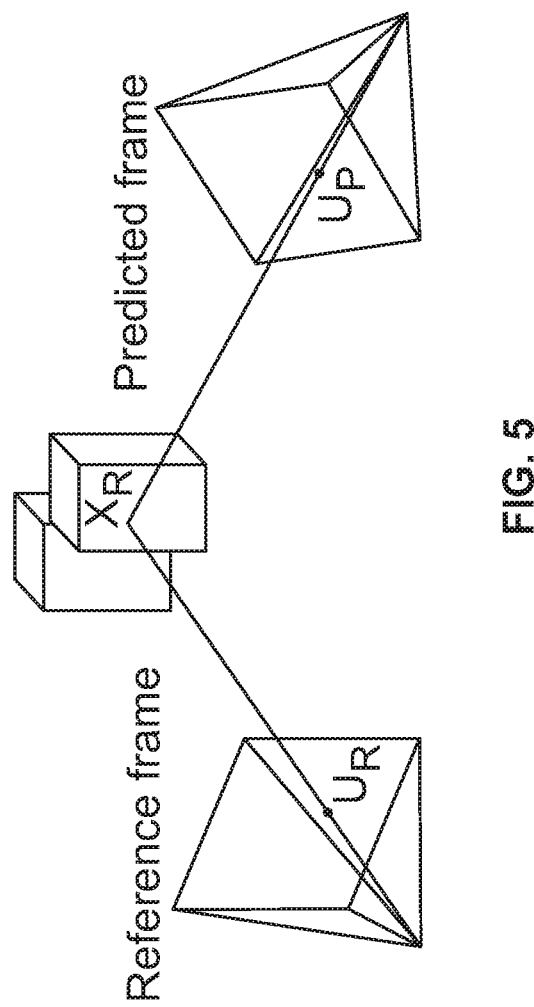
FIG. 5 illustrates an embodiment of computing a location in a reference frame of a pixel from a P-frame.

In the cases in which camera geometry is known, a location in a reference frame of a pixel from a P-frame may be explicitly calculated. FIG. 5 illustrates an embodiment of such a computation. As depicted, a point $X_R$ in a world coordinate system is projected to the points $u_R$ and $u_P$ in the reference and predicted frames, respectively. The location $X_R$ is found as:

$$X_R = A_P^\dagger u_P, \quad (9)$$

where $A_P^\dagger$ denotes the pseudo-inverse of the known perspective transformation matrix of the camera in the predicted frame. The pseudo-inverse is found under the constraint that $X_R$ lies on the first ray-object intersection on the ray cast out of the camera center of projection through $u_P$. The location of the same point in the reference frame is found as:

$$u_P = A_R X_R, \quad (10)$$

where $A_R$ is the known perspective transformation matrix of the camera for the reference frame.

Object motion may also be accounted for. When $X_R$ is found, the object on which the point lies is also found. If the object moves between the reference and predicted frames, the known motion is applied to the estimate of point location. Explicitly:

$$u_P = A_R(\theta_{RP} X_R + \Delta), \quad (11)$$

where $\theta_{RP}$ and $\Delta$ are the known rotation matrix and translation matrix for the object.

Figure 6:
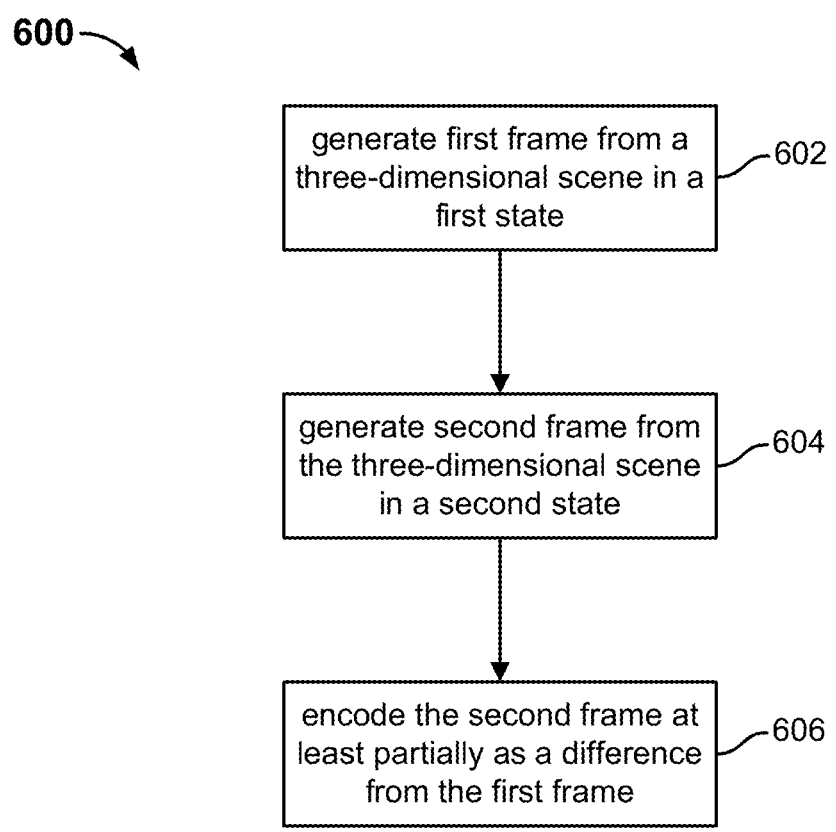
FIG. 6 is a high level flow chart illustrating an embodiment of a process for generating compressed video content.

As described, motion may be estimated from a known three-dimensional geometry of a scene, such as the three-dimensional scene generated by process 100 of FIG. 1. Such motion estimation from scene/camera geometry may be employed with respect to a conventional rendering and compression process such as process 300 of FIG. 3(a) and/or a joint rendering and compression process such as process 320 of FIG. 3B. FIG. 6 is a high level flow chart illustrating an embodiment of a process for generating compressed video content. Process 600 starts at step 602 at which a first frame is generated from a three-dimensional scene in a first state. At step 604, a second frame is generated from the three-dimensional scene in a second state. In some embodiments, the first state and the second state correspond to a time evolution of the scene and, for example, may be associated with motion of objects and/or a camera comprising the scene. At step 606, the second frame is encoded at least partially as a difference from the first frame. Information about the three-dimensional scene/camera geometry in the first state and the second state is used to determine the difference.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
rendering a frame using a first rendering option;
determine whether the frame is an independent frame (I-frame) or a predictive frame (P-frame);
in the event that the frame is an I-frame, render the frame using a second rendering option; and
in the event that the frame is a P-frame, use the frame as rendered by the first rendering option and a previous frame as rendered by the first rendering option to determine prediction error;
wherein the first rendering option and the second rendering option both comprise ray-tracing and wherein the first rendering option comprises ray-tracing with fewer samples and bounces than the second rendering option; and
a memory coupled to the processor and configured to provide the processor with instructions.

2. The system of claim 1, wherein the first rendering option comprises single-bounce ray-tracing.

3. The system of claim 1, wherein the second rendering option comprises ray-tracing in full-detail.

4. The system of claim 1, wherein the first rendering option comprises a lower computational complexity than the second rendering option.

5. The system of claim 1, wherein the frame is generated from a three-dimensional scene.

6. The system of claim 1, wherein in the event that the frame is a P-frame, the processor is further configured to estimate motion from a three-dimensional geometry of an associated scene.

7. The system of claim 1, wherein in the event that the frame is a P-frame, the processor is further configured to perform prediction error coding.

8. The system of claim 7, wherein prediction error coding comprises encoding motion vectors and block differences.

9. The system of claim 1, wherein in the event that the frame is an I-frame, the processor is further configured to independently encode the frame.

10. The system of claim 1, wherein a render time of the first rendering option is less than a render time of the second rendering option.

11. A method, comprising:
rendering a frame using a first rendering option;
determining whether the frame is an independent frame (I-frame) or a predictive frame (P-frame);
in the event that the frame is an I-frame, rendering the frame using a second rendering option; and
in the event that the frame is a P-frame, using the frame as rendered by the first rendering option and a previous frame as rendered by the first rendering option to determine prediction error;
wherein the first rendering option and the second rendering option both comprise ray-tracing and wherein the first rendering option comprises ray-tracing with fewer samples and bounces than the second rendering option.

12. The method of claim 11, wherein the first rendering option comprises single-bounce ray-tracing.

13. The method of claim 11, wherein the second rendering option comprises ray-tracing in full-detail.

14. A computer program product stored on a non-transitory computer readable storage medium and comprising computer instructions for:
rendering a frame using a first rendering option;
determining whether the frame is an independent frame (I-frame) or a predictive frame (P-frame);
in the event that the frame is an I-frame, rendering the frame using a second rendering option; and
in the event that the frame is a P-frame, using the frame as rendered by the first rendering option and a previous frame as rendered by the first rendering option to determine prediction error;
wherein the first rendering option and the second rendering option both comprise ray-tracing and wherein the first rendering option comprises ray-tracing with fewer samples and bounces than the second rendering option.

15. The computer program product of claim 14, wherein the first rendering option comprises single-bounce ray-tracing.

16. The computer program product of claim 14, wherein the second rendering option comprises ray-tracing in full-detail.

17. The method of claim 11, wherein the first rendering option comprises a lower computational complexity than the second rendering option.

18. The method of claim 11, wherein the frame is generated from a three-dimensional scene.

19. The method of claim 11, wherein in the event that the frame is a P-frame, estimating motion from a three-dimensional geometry of an associated scene.

20. The method of claim 11, wherein in the event that the frame is a P-frame, performing prediction error coding.

21. The method of claim 20, wherein prediction error coding comprises encoding motion vectors and block differences.

22. The method of claim 11, wherein in the event that the frame is an I-frame, independently encoding the frame.

23. The method of claim 11, wherein a render time of the first rendering option is less than a render time of the second rendering option.

24. The computer program product of claim 14, wherein the first rendering option comprises a lower computational complexity than the second rendering option.

25. The computer program product of claim 14, wherein the frame is generated from a three-dimensional scene.

26. The computer program product of claim 14, further comprising computer instructions for estimating motion from a three-dimensional geometry of an associated scene in the event that the frame is a P-frame.

27. The computer program product of claim 14, further comprising computer instructions for performing prediction error coding in the event that the frame is a P-frame.

28. The computer program product of claim 27, wherein prediction error coding comprises encoding motion vectors and block differences.

29. The computer program product of claim 14, further comprising computer instructions for independently encoding the frame in the event that the frame is an I-frame.

30. The computer program product of claim 14, wherein a render time of the first rendering option is less than a render time of the second rendering option.

* * * * *